(12) United States Patent
Douillard et al.

(10) Patent No.: US 6,308,621 B1
(45) Date of Patent: Oct. 30, 2001

(54) ROLLER BEARING LUBRICATION SYSTEM AND METHOD

(75) Inventors: Gerald Roger Douillard; Eric Michael Lapine; Michael Robert Lemlin, all of Dover, NH (US)

(73) Assignee: Heidelberger Druckmaschinen AG, Heidelberg (DE)

( * ) Notice: Subject to any disclaimer, the term of this patent is extended or adjusted under 35 U.S.C. 154(b) by 0 days.

(21) Appl. No.: 09/333,169

(22) Filed: Jun. 14, 1999

(51) Int. Cl.$^7$ ....................................................... B41F 5/00
(52) U.S. Cl. ........................ 101/216; 184/6.26; 384/462; 384/471
(58) Field of Search .................................. 101/216, 217, 101/218, 219, 248, 375, 142, 181, 157, 484; 184/6.26, 55.1; 384/462, 471

(56) References Cited

U.S. PATENT DOCUMENTS

| | | | |
|---|---|---|---|
| 3,042,462 | 7/1962 | Rosskopf . | |
| 3,625,145 | * 12/1971 | Heatley, Jr. et al. | 101/216 |
| 3,635,578 | * 1/1972 | Wagner | 101/157 |
| 3,704,669 | 12/1972 | Christoff . | |
| 3,921,519 | * 11/1975 | Zimmer | 101/181 |
| 4,122,772 | * 10/1978 | Dahlgren | 101/218 |
| 4,645,245 | 2/1987 | Cunningham . | |
| 5,269,222 | * 12/1993 | Johnson et al. | 101/484 |
| 5,471,927 | * 12/1995 | Frank et al. | 101/216 |
| 5,484,212 | 1/1996 | Guaraldi et al. . | |
| 5,727,469 | * 3/1998 | Mohrmann | 101/375 |
| 6,142,757 | * 11/2000 | Borchert | 101/216 |
| 6,164,207 | * 12/2000 | Junghans | 101/216 |

FOREIGN PATENT DOCUMENTS

| | | | |
|---|---|---|---|
| 0160102 | * 5/1983 | (DE) | 101/216 |
| 0181641 | * 8/1986 | (JP) | 101/216 |

OTHER PUBLICATIONS

Japanese Patent Abstract JP 61181641 (Mitamura), dated Aug. 14, 1986.

* cited by examiner

Primary Examiner—Eugene Eickholt
(74) Attorney, Agent, or Firm—Herbert L. Lerner; Laurence A. Greenberg; Werner H. Stemer

(57) ABSTRACT

The bearing lubrication system for a cylinder in a printing machine pumps oil from the driving gear side to the roller bearing. The gear side has a gear box and an oil sump with a supply of lubricating oil. An oil loop connects the bearing housing with the gear box fluidically via dry quick disconnects. The dry disconnects allow quick removal of the printing machine cylinder for maintenance or for print job retrofitting. As the printing machine cylinder rotates (it is driven from the gear box), oil is pumped from the gear box into the bearing housing. The bearing is thus lubricated and cooled. The oil is discharged from the bearing housing and returned to the gear box sump.

5 Claims, 2 Drawing Sheets

ROLLER BEARING LUBRICATION SYSTEM AND METHOD

BACKGROUND OF THE INVENTION

1. Field of the Invention

The invention belongs to the mechanical arts. Specifically, the invention lies in the field of roller bearing lubrication in printing technology. The invention, in particular, relates to bearings for printing rollers and a method of lubricating the printing roller bearings.

Printing machines typically operate with a multiplicity of rollers that form nips through which product travels. The product may be a continuous web or individual sheets of paper or cardboard to be printed.

The rollers in the printing machines are supported in lubricated roller bearings. The roller bearings are conventionally lubricated with grease that is supplied from a grease reservoir. Typically, a grease pump enables sporadic pumping of the grease from the reservoir through various grease lines and into strategic locations in the bearings.

2. Description of the Related Art

U.S. Pat. No. 5,484,212 to Guaraldi et al., which is commonly assigned, discloses a method of lubricating a printing cylinder bearing in which an air jet is used to distribute the grease that is pumped into the bearing from a grease reservoir. A printing cylinder is supported by a roller bearing with rolling elements that support mutually opposed bearing race surfaces. In addition to distributing the grease on the rolling elements of the roller bearing, a small amount of grease is axially injected towards the cylinder body, where it forms a grease seal between the bearing housing and the cylinder.

Depending on the speed of the printing unit and/or the associated product-processing system, the rollers rotate at substantial speeds. For instance, blanket cylinders and plate cylinders in offset lithographic printing machines rotate in excess of about 1100 rpm. Lubrication with grease is inadequate to properly remove the buildup of friction heat in the bearings of such cylinders. The art therefore effects a heat exchange with cooling plates attached to the bearing housings. The cooling plates are cooled down by heat exchange with chilled cooling water.

The cooling water supply is a relatively complicated and expensive system. A proper flow and temperature of the cooling water must be ensured so as to assure proper heat exchange. Furthermore, lubrication with grease is not recommended by bearing manufacturers at high speeds. Instead, oil lubrication is recommended.

SUMMARY OF THE INVENTION

It is accordingly an object of the invention to provide a roller bearing lubrication system and method, which overcomes the above-mentioned disadvantages of the heretofore-known devices and methods of this general type and which eliminates the need for an external chilled water cooling source for the bearings and provides for the preferred lubrication with oil instead of grease. With the foregoing and other objects in view there is provided, in accordance with the invention, a bearing lubrication system in a printing machine, comprising:

a bearing;

a gear box having an oil sump with a supply of lubricating oil;

a printing machine roller rotatably supported in the gear box and in the bearing; and an oil loop fluidically connecting the gear box with the bearing for transporting oil from the gear box to the bearing and lubricating the bearing.

In accordance with an added feature of the invention, the bearing is a roller bearing, and including a bearing housing substantially oil-tightly enclosing the roller bearing.

In accordance with an additional feature of the invention, the oil loop is a closed loop leading from the gear box to the bearing housing and back to the gear box.

In accordance with another feature of the invention, an oil pump is connected in the oil loop for pumping the oil from an oil sump in the gear box through the bearing and back to the oil sump.

In accordance with a further feature of the invention, the bearing housing is formed with an inlet and an outlet, and the oil loop comprises a feed line connected between the gear box and the inlet and a discharge line connected between the outlet and the gear box.

In accordance with again a further feature of the invention, a first dry quick disconnect is provided for removably connecting the feed line to the inlet and a second dry quick disconnect for removably connecting the discharge line to the outlet.

In accordance with an alternative embodiment of the invention, the inlet and the outlet are coaxially formed in a two-way valve, the feed line and the discharge line are formed in a single two-way line, and including a two-way dry quick disconnect for removably connecting the two-way line to the two-way valve.

In accordance with a concomitant feature of the invention, the bearing housing includes a cover plate extending substantially orthogonally to a rotational axis of the printing machine roller and the two-way valve is disposed substantially coaxially with the rotational axis of the printing machine roller.

With the above and other objects in view there is provided, in accordance with the invention, a method of lubricating a roller bearing in a printing machine, which comprises the following steps:

rotatably supporting a printing machine cylinder in a gear box and, opposite from the gear box, on a roller bearing assembly disposed in a bearing housing;

providing a dry quick disconnect for an oil loop between the gear box and the bearing housing, and fluidically connecting the gear box with the bearing housing prior to driving the printing machine cylinder from the gear box; and while the printing machine cylinder is driven from the gear box, pumping oil from the gear box into the bearing housing for lubricating and cooling the roller bearing assembly and discharging the oil from the bearing housing and back to the gear side.

Other features which are considered as characteristic for the invention are set forth in the appended claims.

Although the invention is illustrated and described herein as embodied in a roller bearing lubrication system and method, it is nevertheless not intended to be limited to the details shown, since various modifications and structural changes may be made therein without departing from the spirit of the invention and within the scope and range of equivalents of the claims.

The construction of the invention, however, together with additional objects and advantages thereof will be best understood from the following description of the specific embodiment when read in connection with the accompanying drawings.

DESCRIPTION OF THE PREFERRED EMBODIMENTS

Figure 1:
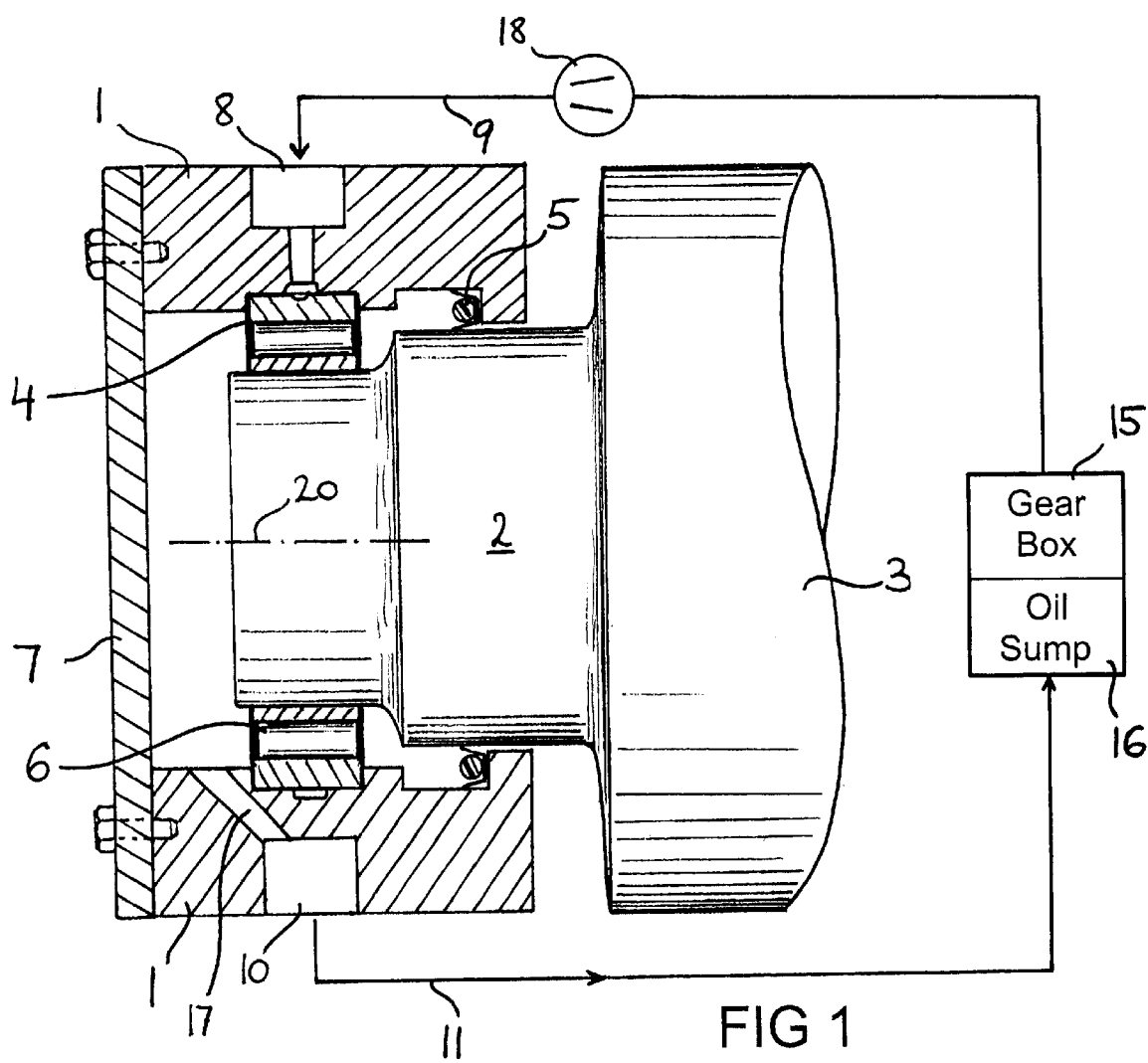
FIG. 1 is a partial schematic sectional view of a roller bearing in a printing press with a first embodiment of the lubrication system.

Referring now to the figures of the drawing in detail and first, particularly, to FIG. 1 thereof, there is seen a bearing housing 1 in which a cylinder journal 2 of a printing roller 3 is rotatably supported. The roller 3 may be a blanket cylinder, a plate cylinder, or any like cylinder that is subject to high rotational speeds in which oil lubrication is advantageous.

The cylinder journal 2 is formed with two segments, namely a reduced-diameter segment that is supported in a roller bearing 4 and a greater-diameter segment at which a bearing housing oil seal 5 is supported. The roller bearing 4 is illustrated in the drawing figure as a single race bearing with one track of rolling elements 6. In a preferred embodiment, the roller bearing 4 is formed with two parallel, mutually inclined races. As diagrammatically indicated in FIG. 2, rolling elements 6 roll on two adjacent tracks about rotary axes which are slightly inclined relative to one another (convexly away from the journal 2). Such roller bearings are commercially available, for example, from the Torrington Bearing Company.

The bearing housing 1 is closed off on its side facing away from the roller 3 by a bearing housing cover plate 7. There is thus formed a substantially sealed space between the walls of the bearing housing 1, the cylinder journal 2, the bearing housing oil seal 5, and the bearing housing cover plate 7. It is thereby assured that the roller bearing 4 is subjected to the lubricating oil that is present in the sealed space.

Oil is injected into the sealed space through a quick disconnect 8 that communicates via an oil feed line 9 with an oil sump 16 of a gear box 15 on the driven side, i.e., the gear side of the roller 3. In other words, the cylinder bearing is lubricated and cooled with oil from the gear side sump 16. The separate oil line 9 is routed to each bearing housing in the system through so-called "dry" quick disconnects so as to avoid oil leakage and air ingestion into the system. The quick disconnects are engaged when the bearing housing is loaded into the respective bearing box. The oil enters at the quick disconnect 8, runs onto the roller bearing 4 and drains out of the bearing housing 1 at an opening 17 that leads to a quick disconnect 10. From there, the oil loop cycles the oil back into the oil sump 16 in the gear box 15 via a discharge line 11.

A pump 18 is illustrated diagrammatically in the oil feed line 9. The oil may also be pumped with a common oil pump within the gear box 15.

Figure 3:
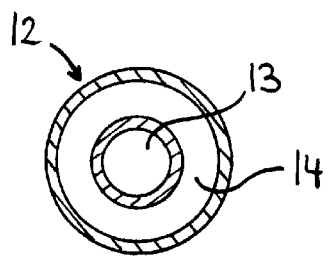
FIG. 3 is a sectional view taken along the line III—III in FIG. 2.
Figure 2:
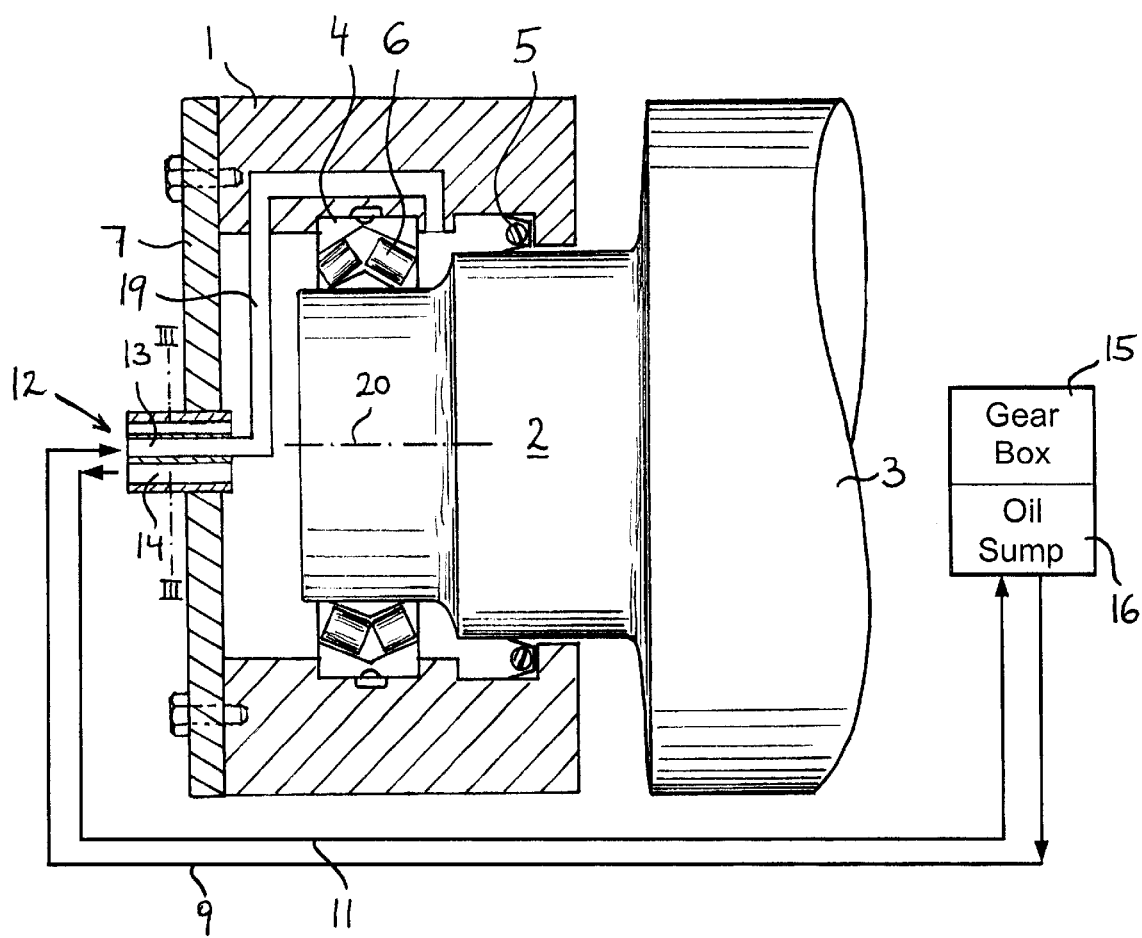
FIG. 2 is similar view of a second embodiment of the novel lubrication system.

Referring now to the alternative embodiment illustrated in FIGS. 2 and 3, there is provided a two-way quick disconnect 12 instead of the two separate connectors 8 and 10. The two-way quick disconnect 12 has a central inlet valve 13 through which the lubricant enters into the bearing housing 1 and an exit valve 14 surrounding the inlet valve 13. The oil entering through the inlet valve 13 is routed via an injector line 19 to the opposite side of the roller bearing 4. From there, it freely distributes throughout the bearing 4, lubricates and cools the bearing, and exits at the outlet valve 14. The two-way line connected to the valves 13 and 14 communicates with the gear box sump 16. It will be understood that the injector line 19 may also be routed to the central oil connector on the roller bearing 4.

The two-way valve 12 is a coaxial valve and the dry quick disconnect provided therefor leads into a coaxial two-way line (the feed line 9 is coaxially disposed within the larger discharge line 11). The printing machine roller 3 rotates about an axis 20 and the two-way valve 12 extends coaxially with the rotational axis 20. The bearing housing cover plate 7 is oriented orthogonally to the rotational axis 20.

A primary advantage of the two-way disconnect is its easy access at the end face of the bearing housing 1. By centering the valve 13/14 on the bearing housing cover 7, there is eliminated the need for precise positioning of the housing relative to the box.

What is claimed is:

1. A bearing lubrication system in a printing machine, comprising:

a roller bearing;

a bearing housing substantially oil-tightly enclosing said bearing;

a gear box having an oil sump with a supply of lubricating oil;

a printing machine roller rotatably supported in said gear box and in said bearing;

an oil loop fluidically connecting said gear box with said bearing for transporting oil from said gear box to said bearing and lubricating said bearing; and an oil pump connected in said oil loop for pumping the oil from said oil sump through said bearing and back to said oil sump;

said bearing housing formed with an inlet and an outlet; and said oil loop including a feed line connected between said gear box and said inlet and a discharge line connected between said outlet and said gear box.

2. The lubrication system according to claim 1, wherein said oil loop is a closed loop leading from said gear box to said bearing housing and back to said gear box.

3. The lubrication system according to claim 1, which further comprises a first dry quick disconnect for removably connecting said feed line to said inlet and a second dry quick disconnect for removably connecting said discharge line to said outlet.

4. The lubrication system according to claim 1, wherein said inlet and said outlet are coaxially formed in a two-way valve, said feed line and said discharge line are formed in a single two-way line, and including a two-way dry quick disconnect for removably connecting said two-way line to said two-way valve.

5. The lubrication system according to claim 4, wherein said bearing housing includes a cover plate extending substantially orthogonally to a rotational axis of said printing machine roller and said two-way valve is disposed substantially coaxially with the rotational axis of said printing machine roller.

* * * * *